H. FUDCZKO.
TRACTION TREAD.
APPLICATION FILED JUNE 8, 1918.

1,298,924.

Patented Apr. 1, 1919.
2 SHEETS—SHEET 1.

INVENTOR
Hilary Fudczko.
BY
his ATTORNEY

H. FUDCZKO.
TRACTION TREAD.
APPLICATION FILED JUNE 8, 1918.
1,298,924.
Patented Apr. 1, 1919.
2 SHEETS—SHEET 2.
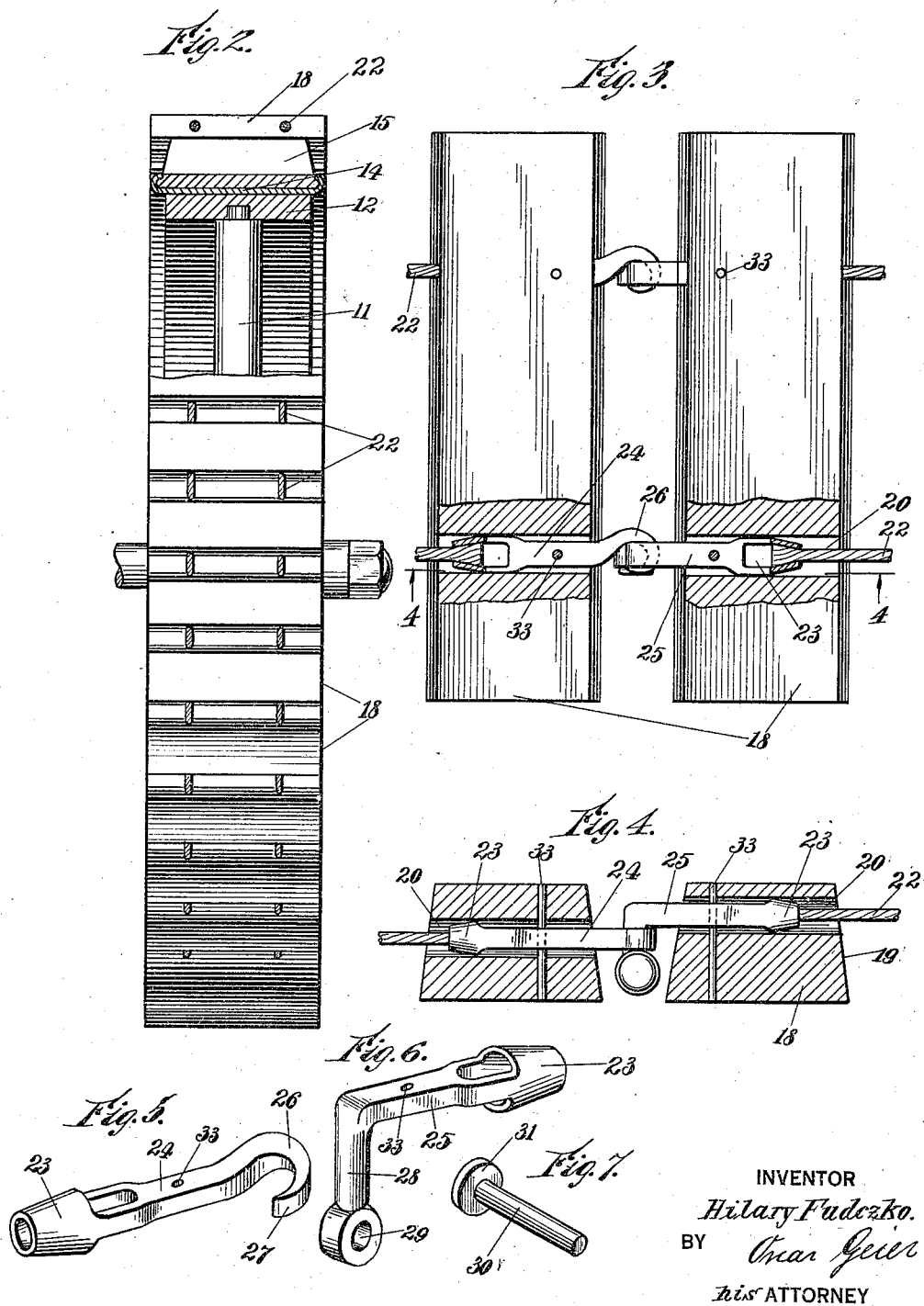
INVENTOR
Hilary Fudczko.
BY
his ATTORNEY

UNITED STATES PATENT OFFICE.

HILARY FUDCZKO, OF PHILADELPHIA, PENNSYLVANIA.

TRACTION-TREAD.

1,298,924.   Specification of Letters Patent.   Patented Apr. 1, 1919.

Application filed June 8, 1918. Serial No. 238,856.

*To all whom it may concern:*

Be it known that I, HILARY FUDCZKO, a citizen of the United States, residing at Philadelphia, county of Philadelphia, and State of Pennsylvania, have invented certain new and useful Improvements in Traction-Treads, of which the following is a specification.

This invention relates to improvements in vehicle treads and particularly to heavy types thereof.

The principal object of the invention is to provide a device which may be engaged with the exterior of an ordinary wheel tread or tire to prevent slipping or skidding, and by which an exceptional tractional effect is obtained.

A further object is to provide means whereby the device may be readily engaged or disengaged from the tire.

These and other like objects are attained by the novel construction and combination of parts hereinafter described and shown in the accompanying drawings, forming a material part of this disclosure, and in which:—

Fig. 2 is a front view of the same, parts being broken away in order to show the interior.

Fig. 3 is an enlarged fragmentary sectional view, showing a pair of contact blocks and the joints connecting therebetween.

Fig. 4 is a transverse sectional view, taken on line 4—4 of Fig. 3, and

Figure 1:
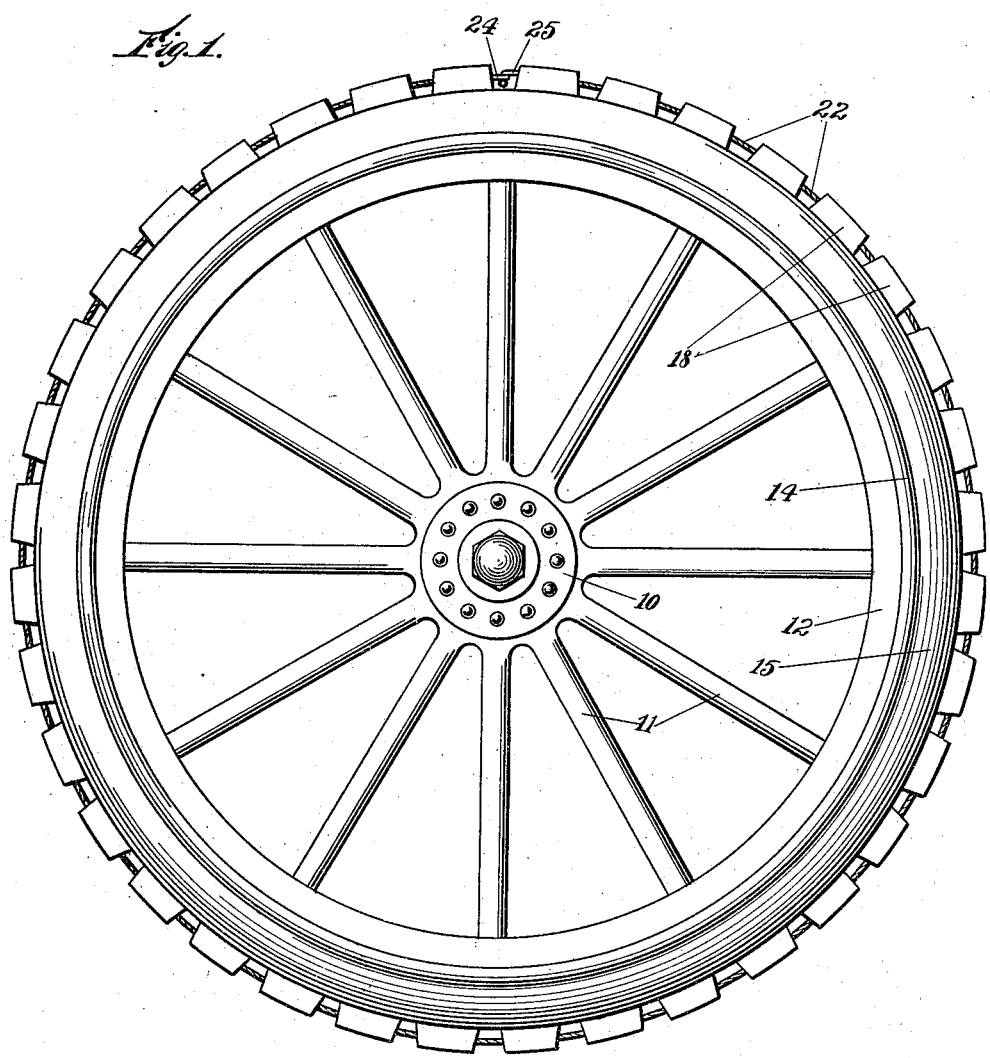
Figure 1 is a side elevational view, showing a conventional type of wheel, indicating the application of the invention.

Figs. 5, 6 and 7 respectively, are perspective views showing details of the construction.

A wheel of conventional type is shown in the drawings, consisting of a hub 10, in which are engaged rigid spokes 11, connecting at their outer end in the rim or felly 12, circumjacent to which is an annular band 14, having outwardly curved marginal edges containing the usual tread 15, the foregoing parts being of any ordinary type of construction.

The invention consists in the use of a plurality of metallic blocks 18, of a length adapted to extend completely across the width of the wheel tread, and preferably formed with beveled sides 19, through which extends a pair of transverse openings 20, receptive of cables 22.

The ends of the cable 22 are entered into sockets 23, having a conical interior and in which the cable ends are spread and secured by lead in an ordinary manner.

Engaged with the sockets 23 are shanks, respectively 24 and 25, the former terminating in a hook 26, having a spring lip 27, while formed with the shank 25 is an angularly turned stem 28, adapted to be received in the hook 26.

At the extreme lower end of the angularly turned element 28 is an eye 29, suited to receive a pin 30, having a head 31, so that when the same is entered into the opening, the bar 28 is prevented from moving out of the hook 26, it being understood that the length of the cables is such as to be suited to the circumference of the wheel, thereby avoiding take-ups or springs of any kind.

Pins 33 are passed transversely through the blocks 18, the same intersecting the shanks 24 and 25, and retaining them in position.

In operation, the several blocks 18, having been disposed around the periphery of the wheel, the bar elements 28 are forced into the hooks 26, and secured therein by insertion of a headed pin 30, it being understood that terminal blocks 18 are forced under a very considerable pressure toward each other at the time of engaging the blocks, causing the remainder of the blocks to firmly seat upon the flexible tread, to such an extent as to prevent any of the blocks from slipping or moving from their assembled position.

Having thus described my invention what I claim as new and desire to secure by Letters Patent, is.

1. In a traction device, the combination with a tread of a wheel, of a plurality of rectangular metallic blocks adapted to extend transversely of said tread, said blocks having openings extending therethrough, cables passing through the mentioned openings, shanks having sockets with which one end of each of said cables are rigidly affixed, a spring hook formed with one of said shanks, an arm formed with the other of said shanks adapted to be contained in said spring hook, and means for securing said arm therein.

2. In a traction tread for vehicles, the combination with a tread of the vehicle and a plurality of rectangular metallic blocks disposed transversely on the surface thereof, of a pair of cables passing through each of said blocks, sockets rigidly secured to the ends of said cables, a resilient hook formed with one of said sockets, an angularly extending arm formed with the other of said sockets, said arm being engageable within said hook, an eye formed with said arm below the point of engagement thereof, and a pin engageable in said eye whereby said arm is prevented from disengagement with said hook.

In testimony whereof I have affixed my signature.

HILARY FUDCZKO.